Aug. 12, 1958     E. THOMPSON, JR     2,847,197
DASHER MEANS FOR FROZEN CONFECTIONS PRODUCING APPARATUS
Original Filed Aug. 31, 1951     4 Sheets-Sheet 3
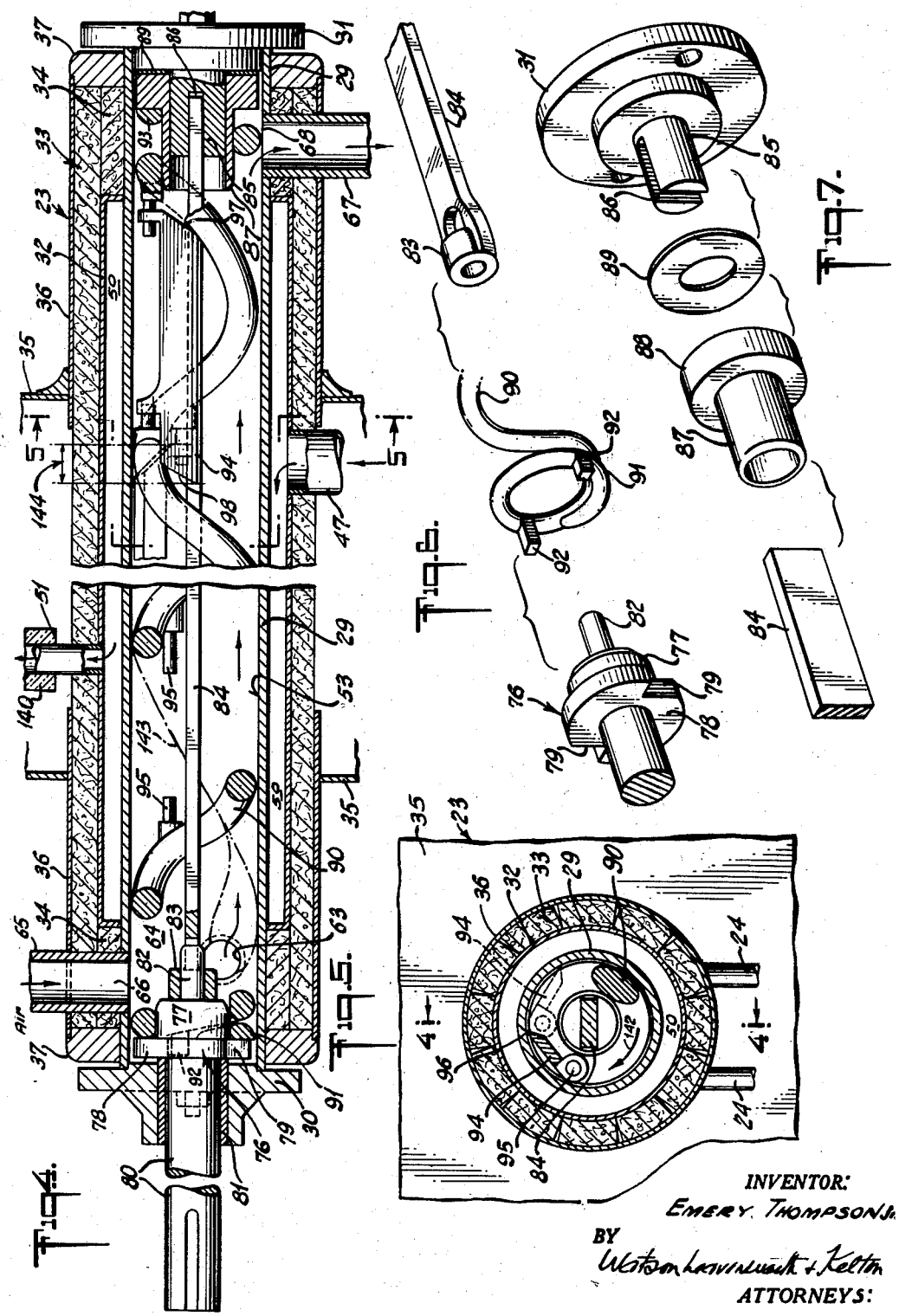
INVENTOR:
EMERY THOMPSON JR.
BY
ATTORNEYS:

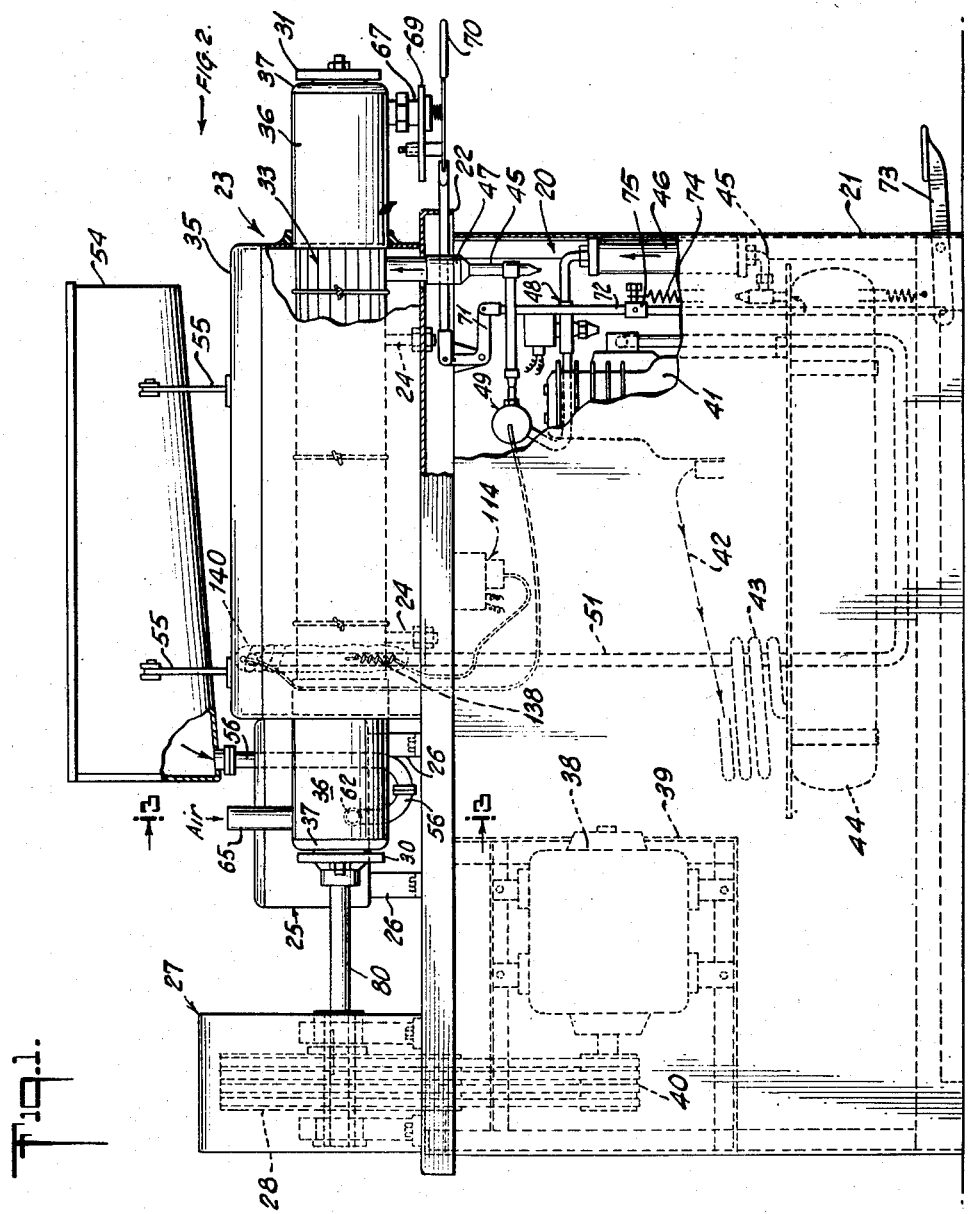

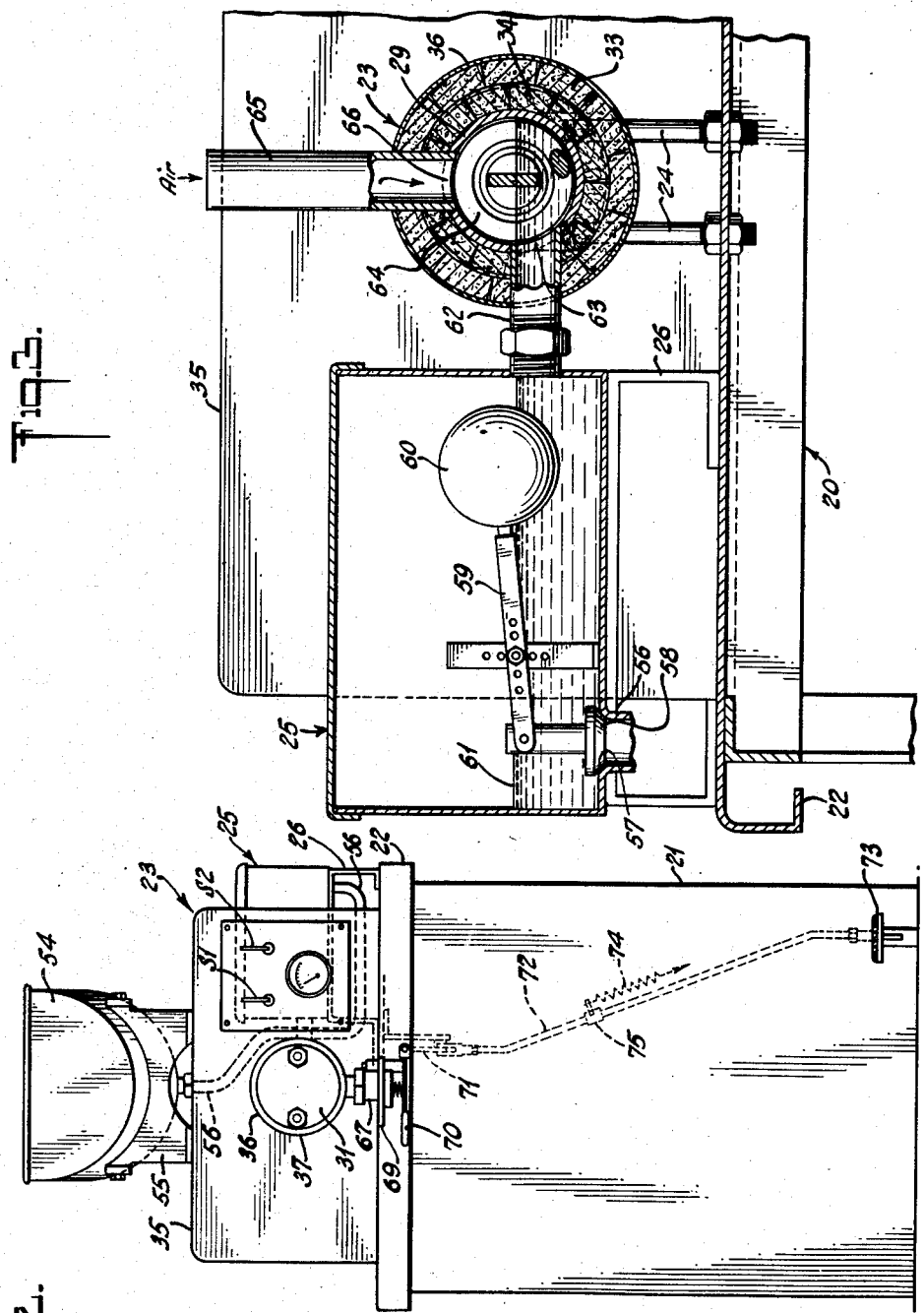

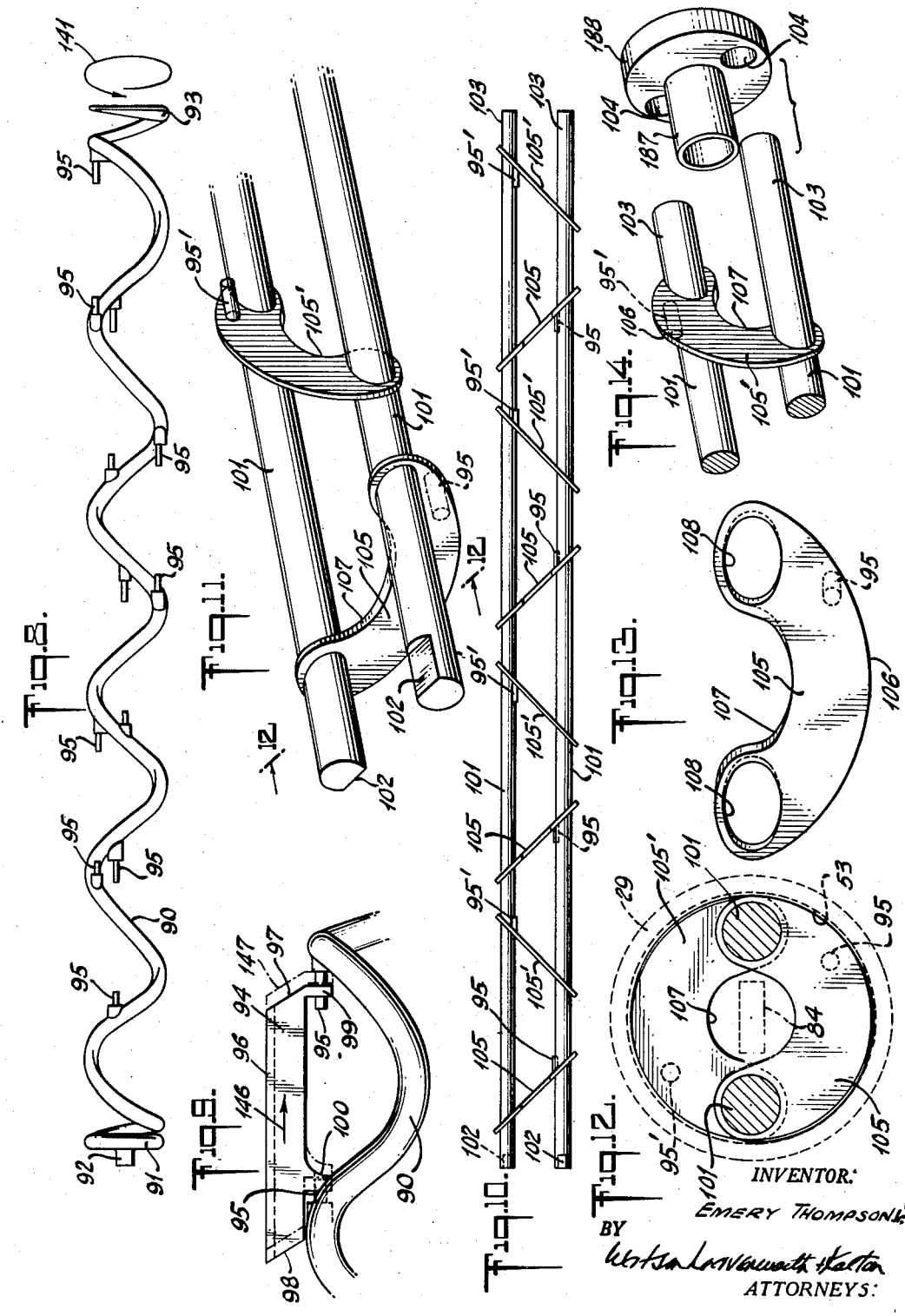

United States Patent Office 2,847,197
Patented Aug. 12, 1958

2,847,197

DASHER MEANS FOR FROZEN CONFECTIONS PRODUCING APPARATUS

Emery Thompson, Jr., New Rochelle, N. Y., assignor to Emery Thompson Machine & Supply Company, New York, N. Y., a corporation of New York Original application August 31, 1951, Serial No. 244,630, now Patent No. 2,740,264, dated April 3, 1956. Divided and this application July 11, 1955, Serial No. 522,489

14 Claims. (Cl. 259—109)

The present invention relates to apparatus for making and serving frozen confection products and, more particularly, to dasher means thereof, such devices, though capable of producing a variety of types of frozen products, being most familiar to the public in the production and sale of the frozen confection called "frozen custard," and the present application is a division of my application Serial No. 244,630, filed August 31, 1951, now Patent 2,740,264, dated April 3, 1956.

A general object of the present invention is to provide such apparatus and dasher means thereof which are easily and simply made in an economical and rapid manner in mass production, the parts being readily assembled with minimum manipulation, the devices efficiently being operable in a manner producing a high quality product while avoiding operational shut-down which may be otherwise caused by build-up of frosted stock on freezer chamber walls.

A more specific object of the present invention is to provide simple freezer structure featuring simple but effective dasher means which may be operated in the freezer chamber in a manner for efficient attainment of a desired degree of overrun in the plastic product and which will feed the latter through a gated delivery opening.

Another object of the present invention is the provision of simple but sturdy and effectively operable dasher structure featuring frost scraping means and which is easily and economically made and readily serviced and cleaned.

Still another object of the present invention is to provide structural embodiments of the apparatus and parts thereof which may be readily constructed and permit efficient use and operation.

Other objects of the invention will in part be obvious and will in part appear hereinafter.

The invention accordingly comprises the features of construction, combination of elements and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

Fig. 1 is a side elevational view, with parts broken away and in section, and others diagrammatically shown, of an embodiment of apparatus of the present invention for producing frozen confections;

Fig. 2 is a front end elevational view of the apparatus shown in Fig. 1;

Fig. 3 is a sectional view, to an enlarged scale, with parts broken away and in section, taken substantially on line 3—3 of Fig. 1;

Fig. 4 is an axial section, to an enlarged scale, with parts broken away, of the jacketed cylinder and an embodiment of the dasher structure of the apparatus shown in Fig. 1 and taken substantially on line 4—4 of Fig. 5;

Fig. 5 is a detailed transverse section taken substantially on line 5—5 of Fig. 4;

Fig. 6 is an exploded perspective view, with parts broken away and in section, of a portion of the dasher structure and the driving means therefor at the inlet end which are shown in Figs. 4 and 5;

Fig. 7 is a view similar to Fig. 6 of parts of the other end of the dasher structure shown in Figs. 4 and 5;

Fig. 8 is a side elevational view to a reduced scale of the feed part of the dasher structure shown in Figs. 4 to 7, incl.;

Fig. 9 is an enlarged detail of dasher structure shown in Figs. 4 to 8, incl.;

Fig. 10 is a plan view of the feed part of a modified form of dasher structure;

Fig. 11 is an enlarged perspective detail of the receiving end of the dasher structure embodiment shown in Fig. 10;

Fig. 12 is a sectional view taken substantially on line 12—12 of Fig. 11 and showing in dotted lines the cylinder in which it is to be rotated and a whipping or mixing bar which may be employed therewith;

Fig. 13 is an enlarged perspective side view of one of the agitating and advancing blades of the dasher structure embodiment shown in Figs. 10, 11 and 12; and Fig. 14 is a perspective exploded detail, with parts in section, of the discharge end of the dasher structure shown in Figs. 10 to 13, incl., showing means for support thereof.

Referring to the drawings, in which like numerals identify similar parts throughout, it will be seen that a preferred embodiment of the apparatus for producing frozen confections of the present invention may comprise a supporting base structure 20 encased by a casing 21 for suitably housing various parts and having a platform top 22 on which other parts are mounted. Upon the platform top 22 is suitably mounted in a lateral and preferably substantially horizontal position a freezer 23, such as by means of tie bolts 24—24, a temporary storage tank 25, such as by means of suitable bracket feet 26, 26, and a hood 27 suitably housing dasher driving means, such as a driven pulley and driving belt structure indicated in dotted lines at 28 in Fig. 1.

The freezer unit 23 comprises a lateral or substantially horizontal, elongated cylinder 29, suitably closed at its inlet end by head 30 and at its outlet by head 31. A mid-section of the cylinder 29 is surrounded by a refrigerant jacket 32 suitably covered by insulating means 33, such as a plurality of adjacent, longitudinally-extending cork strips which cooperate with underlying bands of insulation 34 beyond the ends of the jacket 32 and engaged directly about the exposed ends of the cylinder 29 protruding from opposite ends of the jacket, with such bands of insulation also preferably formed of longitudinally-extending cork strips, as will be seen from Figs. 3 and 4. A housing 35 covers the central section of the jacketed and insulated cylinder 29 and cylindrical covers 36, 36 cooperate with end plates 37, 37 to cover the insulation about the protruding ends of the cylinder.

Within the base casing 21 is suitably mounted the usual dasher-operating mechanism and refrigerant circulatory system. Such mechanism may comprise an electrical motor 38 supported on hanger structure 39 and suitably belted, such as at 40, to the pulley driving structure in housing 27, as shown in dotted lines in Fig. 1. The refrigerant circulatory system may comprise a compressor 41 connected by an outlet conduit diagrammatically shown at 42 through condenser coil 43 to the usual reservoir 44. From the reservoir 44, a supply conduit 45 for compressed refrigerant preferably feeds through a dehydrating dryer 46 to jacket inlet or supply duct 47, through a solenoid valve 48 and an expansion valve 49 connected in series. As shown in Figs. 1 and 4, supply duct 47 communicates at the bottom with heat exchanger space 50 inside jacket 32 within the housing 35. A return line duct 51 communicates with space 50 at the top, also within the jacket 35, to extend down through a hole in platform top 22 into the base housing 21 for return connection to compressor 41, as seen in Figs. 1 and 4. The compressor 41, of course, includes suitable motive means, such as a self-contained electrical motor (not shown).

The means for supplying fluid or liquid stock to cylindrical freezing chamber 53 provided by the interior of the cylinder 29 preferably comprises an elevated storage supply tank 54 mounted for gravity feed above the freezer unit 23 and preferably upon the casing 35 thereof by means of leg brackets 55, 55, as shown in Figs. 1 and 2. An eduction pipe 56 connects a low point of the bottom of the interior of the tank 54 to the bottom of temporary storage tank 25 so as to feed fluid stock to the latter by force of gravity. The outlet opening of the eduction pipe 56 is circumscribed by a valve seat 57 on which seats a float-operated lift valve 58, suitably connected by linkage and lever means 59 to a float 60 located within tank 25 to control the supply thereto of liquid stock and while amounts of the latter are withdrawn to maintain automatically therein the quantity of stock at a uniform level, such as that indicated at 61 in Fig. 3. Fluid stock is fed from temporary storage tank 25 to the inlet end of the cylinder 29, which is closed by head 30, by a suitable duct in any suitable manner at a point preferably below the level 61 dictated by float 60. Preferably, for this purpose, a pipe 62 extends laterally to connect the interior of tank 25 to an inlet opening 63 in the side of the inlet end of the cylinder 29, and preferably the top of that inlet opening and the top of the passage provided by the interior of pipe 62 are located substantially at the level 61 which in turn is preferably in the vicinity of the axis of the cylinder, as indicated in Fig. 3. As a result, an appreciable gas head space 64 is provided above the level 61 of the top of the fluid stock as it is supplied to the chamber 53 through the inlet opening 63.

Gaseous medium, such as carbon dioxide, nitrous oxide, etc., but preferably air, is supplied directly to the gas head space 64 in the cylinder chamber 53 at the inlet end. For this purpose, a stand pipe 65 is preferably provided to communicate the atmosphere with a gas inlet opening 66 in the top of the inlet end of the cylinder 29, as shown in Figs. 1, 3 and 4. This provides the necessary gas requirements for producing the desired aerated condition known as "overrun," fully discussed in my Patent No. 2,132,364 of October 4, 1938. When pipe 65 is open to atmosphere for supply of air to attain the desired degree of overrun, it may serve as a simple means whereby fruit or other ingredients may be added in a ready manner by the operator.

As shown in Figs. 1, 2 and 4, the outlet end of the freezer unit 23 is provided with a suitably gated discharge passage which may comprise a depending tube 67 communicating with the chamber 53 by way of discharge opening 68 and closed at its bottom end by pivoted gate 69 to be swung laterally by a manual handle 70. Manual handle 70 is linked through a bell crank lever 71 to a lift rod 72 pivotally connected to a foot pedal 73, with the rod spring-biased downwardly by suitable spring means 74 anchored to the rod in any suitable manner, such as by fixture 75. Fixture 75 may, if desired, be employed to operate a circuit closing switch for energizing the freezer motor, as more fully explained hereinafter in connection with Fig. 15. Thus, either by depressing foot lever 73, or by swinging hand lever 70 to one side, gate 69 may be caused to uncover the outlet of discharge tube 67 for delivery of frozen confection in a plastic condition for consumer consumption.

Although a variety of types of dasher constructions may be used in such freezer apparatus, simplified economically constructed unique dasher structure of my invention is preferred. Such dasher structure comprises agitating and whipping rotary mechanism of open screw construction having through passages from end to end in order to beat into the supplied stock the necessary amount of gas to attain the desired degree of overrun and, while it is being beaten and frozen to a plastic aerated product, to advance or feed it to the gated outlet for delivery to customers.

An embodiment of such dasher construction is shown in Figs. 3 to 9 incl. As therein indicated, such dasher construction may comprise a rotary driving head 76 having a stepped cylindrical core element 77 extending coaxially from a circular flange 78 provided with a pair of diametrically-arranged driving notches 79, 79. The driving head 76 preferably is provided as an integral part of the driving shaft 80 suitably rotatably supported in a journal 81 extending axially through closing head 30, with the shaft adapted to be driven by the pulley construction 28. The smaller stepped portion of core element 77 preferably constitutes an axial extension 82 to be slidably and rotatably received in a collar 83 fixed on one end of a whipping bar 84. Preferably, the whipping bar 84 is rectangular in section and provided as a flat strip, although a variety of other shapes might be used. The other closing head 31 carries a fixed, inwardly-extending stub shaft 85 having a transverse slot 86 therein to receive and hold the other end of mixing or whipping bar 84. A rotatable sleeve 87 is slidably mounted on stub shaft 85 and has an enlarged head 88 bearing against a thrust washer 89. Thus, the mixing or whipping bar 84 will be held stationary by the stub shaft 85 while sleeve 87 may rotate on the latter.

The agitating and advancing or feeding structure of the dasher construction may comprise a spiralled rod 90 having a complete turn 91 at one end to be slidably received over the larger portion of core 77 carried by driving head 76. Turn 91 carries diametrically-arranged, axially-extending driving lugs 92, 92 to be received in driving head notches 79, 79. The turns of the spiralled rod 90 are preferably of an outside diameter slightly less than the internal diameter of chamber 53 so as to be freely rotatable therein while assuring obtainment of maximum thrust. The other end of the spiralled rod 90 has a turn 93 therein to receive the reduced portion of the rotatable sleeve 87 for support thereby. The intermediate successive turns of spiralled rod 90 intervening the end turns 91 and 93, or portions of these successive turns, constitute a plurality of successive plastic material-advancing means.

In order to scrape the frosted material as it is formed on the inside face of chamber 53 therefrom and beat it back into the body of stock and/or forming plastic material, the spiralled rod 90 is provided with a plurality of centrifugally-cockable, longitudinally-extending scraper blades 94—94 so arranged that their sharp leading edges overlap longitudinally to scrape clean the entire inner surface of the freezing chamber opposed to the dasher construction. For support of each scraper blade 94, successive turns of the spiralled rod 90, i. e., the successive plastic material-advancing means defined thereby, are provided with opposed pairs of pivot pins 95, 95. Preferably each scraper blade 94 is of a shape similar to that shown in Figs. 4, 5 and 9, having a sharp leading edge 96, an oblique front edge 97, and an oblique rear edge 98 arranged substantially parallel to the front edge. Each scraper blade 94 is provided with a pair of longitudinally-spaced apertured base ears 99 and 100 respectively to receive the front and rear pivot pins of each pair 95, 95. Fig. 9 illustrates the simplicity of mounting such a scraper blade on an opposed pair of pivot pins 95, 95 wherein it is shown that with the scraper blade swung radially out away from the spiralled rod 90, the front apertured ear 99 may be positioned over the preferably longer front pivot pin 95 and pushed forward in the direction of the arrow to the dot-dash position 147 so that the rear apertured ear 100 may be slipped over the end of the preferably shorter rear pivot pin. The scraper blade is then slid back to the full line position shown in Fig. 9 and permitted to drop down so that its oblique front edge 97 rests in the vicinity of or abuts against an adjacent portion of the turn of the spiralled rod 90 supporting it, as indicated in Fig. 4. Thus, as the dasher construction is rotated to feed the plastic material forward through the cylinder chamber 53 by screw action, the action of those scraper blades 94—94 and drag of material thereon is prevented from dislodging or dismounting the scraper blades, while permitting their ready removal for conditioning and sharpening. Limited longitudinal motion of each scraper blade 94 in either direction is possible when the dasher frame and blades are disposed in and rotated in the whipping chamber 53, but it is limited to an extent preventing disengagement of ears 99 and 100 from pivot pins 95, 95.

A further simplified form of the dasher construction which may be preferred is illustrated in Figs. 10 to 14 incl., and, as therein shown, may comprise a pair of parallel, longitudinally-extending, laterally-spaced rods 101, 101 having their ends at the inlet end of the apparatus flatted at 102, 102 as shown in Fig. 11, to be suitably received and fitted in driving notches 79, 79. The opposite ends 103, 103 of the rods 101, 101 are adapted slidably to be received in diametrically-opposed holes 104, 104 in the face of flange 188 of a modified form of rotatable sleeve 87 to be mounted on stub shaft 85. The pair of parallel rods 101, 101 carry at spaced intervals two sets of like blades 105—105, and 105'—105', with those in one set 105—105 arranged obliquely forward with respect to transverse planes, and alternate ones of the other set 105'—105' arranged obliquely back away from such transverse planes, as most clearly seen in Fig. 10. The blades 105—105 of one set are located on one side of the pair of rods 101, 101, and those of the other set 105'—105' on the opposite side, as will be seen from Figs. 11 and 12, so that together they form a screw structure adapted when rotated to advance plastic material from one end to the other.

Each blade 105 or 105' has an outer edge 106, substantially arcuate in shape and extending about 180°, to be rotated closely adjacent to the inner cylindrical surface of the chamber 53, as shown in Fig. 12. Preferably the central portion at 107 of each blade 105 or 105' is cut away, as indicated in Figs. 11, 12 and 13, to provide clearance for a whipping or mixing member, such as fixed bar 84. Thus each blade 105 or 105' may be generally C-shaped in outline, with the tips thereof apertured at 108, 108, as indicated in Fig. 13, slidably to receive the rods 101, 101, on which the blades may be thereafter fixed in proper positions in any suitable manner, such as by welding, although other means carried thereby may be employed properly to space them. It will be understood, however, that the central portions of each blade 106 need not be cut away at 107 if the use of a mixing or whipping bar is not desired, or each blade may be somewhat fan-shaped and have a medial aperture in the area 107 to receive such a mixing or whipping bar.

Successive blades of each set obliqued in the same direction (105, 105 or 105', 105') carry a pair of the opposed pivot pins (95, 95 or 95', 95') so that one of the scraper blades 94, or a scraper blade of modified construction, may be mounted thereon in a manner similar to that previously described. Thus, the front end of a scraper blade mounted upon opposed pivot pins 95, 95, on a pair of forwardly-obliqued blades 105, 105 on one side of the rods 101, 101, will have its front end longitudinally overlapped by the rear end of the next succeeding scraper blade pivotally mounted on the opposed pair of pivot pins 95', 95' of a pair of blades 105', 105' obliqued in the opposite direction to the rear and with the rear blade of that pair intervening the two blades of the former pair. Accordingly, the entire cylindrical inner surface of the chamber 53 opposite the dasher construction illustrated in Figs. 10 to 14 incl., will be scraped effectively by such blades in rotation of the dasher construction.

In operation of the freezer apparatus shown in Figs. 1 to 9 incl., liquid confection stock contained in the elevated storage supply tank 54 will be permitted to flow through duct 56 into temporary storage tank 55 with valve 58 lifted by virtue of the low position of float 60. As float 60 rises with increase in the quantity of stock collected in tank 25, valve 58 will finally close the orifice in seat 57 with the surface of the liquid substantially at the level 61. Liquid stock will flow through conduit 62 and inlet opening 63 into the inlet end of freezer chamber 53, and with the body of the stock therein superposed by a head of air in space 64 in direct communication with the atmosphere through gas inlet opening 66 and gas supply stand pipe 65.

The rotary dasher structure in the freezer chamber 53 will then be rotated in a counter-clockwise direction as the dasher structure is viewed from the front or discharge end of the freezer, as indicated by the arrow 141 in Fig. 8 and arrow 142 in Fig. 5. The dasher structure is so rotated by means of shaft 80, drive pulleys 28 and 40 belted together, and freezer motor 38 which is suitably energized. The compressor motor is energized suitably to operate compressor 41 so that pressure of refrigerant is built up in reservoir 44 to be supplied by supply conduit 45 through the open solenoid valve 48 and the open expansion valve 49, and thence through duct 47 to the heat transfer space 50 about the freezing chamber 53. With heat being withdrawn from the fluid stock in the freezer as it is beaten and whipped, frosted amounts thereof tend to build up on the inner wall of the freezer cylinder 29. Rotation of the dasher structure causes the scraper blades 94—94 carried thereby to be swung outwardly or cocked by centrifugal action so that their sharp noses or leading edges 96—96 will scrape the frost from the wall of freezing chamber 53 to mix it back into the body of supplied material and to be churned up therein by cooperative action of the rotating spiral, the scraper blades, and the effect of the fixed flat mixing bar 84. As a result, partial solidification of the confection stock will cause it to become of plastic consistency and the resultant plastic body to be driven forward by the rotating dasher structure to the discharge outlet 68.

The dot-dash line at 143 in Fig. 4 indicates the approximate surface shape of the supplied stock and partially frozen confection material as it is being frozen and agitated, and, as therein indicated, there is a substantial gas head space 64 thereabove at the inlet end to permit supplied gas or air to be whipped or beaten into the supplied stock as it is agitated in the freezer and chilled to freezing with attainment of the desired degree of overrun. The removal of the frost from the inner surface of the freezing chamber 53 by the series of scraper blades 94—94 is assured by virtue of the fact that longitudinally the rear and front ends of successive blades overlap. This will be evident from an inspection of Fig. 4 wherein appreciable overlap is indicated at 144.

The frozen confection in a plastic condition having the desired degree of overrun will be withdrawn at will through the discharge outlet 68 and discharge duct 67 by opening the gate 69 with lateral swing, either by swinging the hand lever 70 to one side or depressing the foot pedal 73. Of course, at such times the freezer motor 38 must be operating the dasher structure in order to cause the latter to feed the plastic material forward by screw action. If the movable contact of switch S1 be moved over to a manual position it will connect the freezer motor 38 to an electrical supply line. Such energization of the freezer motor 38 may be effected automatically with opening of the discharge gate 69 by providing an automatically-operated circuit closing switch in shunt of the manual setting of switch S1. Such a circuit closing switch can be of a type wherein a biasing spring tends to maintain it open with operating means opposing the force of the biasing spring to close it. The operating means may be connected in any suitable manner to any portion of the linkage connected between the manual lever 70 and the foot pedal 73, and for this purpose may, for example, be connected to the biasing spring anchorage 75 fixed on the rod 72.

The modified form of dasher structure shown in Figs. 10 to 14 incl. not only effectively accomplishes all of the operational functioning of the embodiment shown in Figs. 4 to 9 incl., but in addition, may be found to be much more readily constructed and manufactured in mass production. As will be noted from the drawings, that second embodiment of the dasher structure is extremely simple and the parts thereof are readily and easily assembled to assure economy in production. Further, that structure permits ready mounting in the freezer, allows efficient agitating and screw advancing operations thereof, and also permits easy, quick and simple cleaning and servicing. Obviously, the scraper blades similar to 94 which will be employed with the dasher structure shown in Figs. 10 to 14 incl., are mounted and demounted in a similar simple manner. For example, as shown in Fig. 9 in order to remove the scraper blade 94, one need merely to rotate it so that it extends upwardly or radial of the dasher structure proper, and move it in the forward direction indicated by the arrow 146 to the dot-dash position 147, so as to free the rear apertured ear 100 from the rear pivoting pin 95 to permit the front apertured ear 99 to be slid back off of front pivot pin 95. Such easy removal permits sharpening of the scraper blade and any truing up or other servicing thereof that may be necessary.

Proper setting of the two control switches S1 and S2, indicated on the front of the apparatus in Fig. 2, by manipulation to either manual operation or automatic operation positions, will dictate and control operation of the freezing apparatus. For example, closure of switch S1 to the manual position by swinging its control over to one side will, as previously explained, connect the freezer motor 38 to an electrical supply line and energize it. Freezer motor 38, of course, rotates the dasher structure in the freezer cylinder to prepare frozen confection having the desired overrun, and to drive it forward to the outlet end of the freezer cylinder to be discharged through the gated discharge opening at the will of the operator to supply a customer demand. The solenoid valve 48 which primarily controls circulation of the refrigerant in the refrigerating duct system cannot be turned on or, that is, opened by energization of its coil unless the freezer motor is running when switch S2 has its movable contact also moved over for circuit closing at the manual position. Thus, the freezer motor may be operated alone without circulation of refrigerant either by manual setting of switch S1 or closure of the shunt switch operable by the gate linkage, and this, of course, permits delivery from the freezer of frozen plastic confection product by motor drive of the dasher structure, while making it necessary that the dasher structure be rotated by the freezer motor in order to obtain circulation of refrigerant when switch S2 is also at manual setting. This precaution, of course, assures that there can be no such undue build-up of solidified frozen material on the inner walls of freezing chamber 53 as would prevent proper operation of the device, either by slowing or totally preventing rotation of the agitating and feeding dasher structure.

Under such manual setting operation, and with the a thermostat switch (indicated at 114 in Fig. 1) open, a first control bulb embedded in insulation 140 solely controls the temperature within the freezer since expansion valve 49 is controlled by that control bulb in response to return duct temperature, and circulation of refrigerant as dictated by the opening of the expansion valve 49. Response to control of this control bulb presumes that the solenoid valve at 48 is open by energization of its coil with the control switch S2 on manual setting and with the freezer motor operating with control switch S1 also on manual setting point.

On automatic setting with the second control switch S2 manipulated to the automatic position so that its movable contact closes a control circuit, the coil of the solenoid valve 48 will be connected across the supply line through thermostat switch 114. This thermostat switch is manipulated by and under the control of a second control bulb 138 embedded in insulation 140.

On automatic setting, operation of the thermostat switch 114 by its control bulb, in response to the temperature in the field of temperature influence of a portion of return conduit 51, dictates the operation of the flow of refrigerant through the refrigerant circulatory system to chill the walls of the freezing chamber and develop frost thereon. With the thermostat switch 114 closed, the freezer motor is operated to rotate the dasher structure in the freezer chamber so as to scrape the frost from the chamber walls, beat and whip it back into the body of supplied stock to form a frozen plastic product, also to beat into the supplied stock sufficient quantity of gas or air to attain the desired overrun, and also to feed the finished plastic product forward to the outlet end and through the gated outlet when opened for supply of customer demands. Thus, with the control switches S1 and S2 manipulated to automatic settings, the thermostat switch 114 and its control bulb may be considered to be the master control device of the control system.

Also, though not entirely necessary, it is desirable to use the second control bulb for dictating the setting of the expansion valve 49, so that there will be temperature control of the flow of refrigerant through the refrigerant circulatory system at all times. As explained, whenever control switch S2 is on manual setting, solenoid valve 48 is opened upon operation of the freezer motor 38. But, of course, rotation of the dasher structure by the freezer motor 38 is frequently desired when there is no demand for heat transfer from the confection material in the freezer, such as at times of developing overrun and delivering finished product from the freezer. Under such conditions when there is no refrigerant flow control by the second control bulb, the first control bulb performs that function. On automatic setting of control switch S2, of course, the solenoid valve 48 is connected across the supply line only through closure of the thermostat switch 114 operated by its control, which, in turn, responds to the temperature of the field of influence of the return conduit temperature. Thus, the use of the two control bulbs embedded in the return conduit insulation 140 assures that circulation of refrigerant in its circulatory system is permitted only when the temperature of the field of temperature influence of the return conduit becomes higher than a predetermined maximum so as demand from one or more of the control bulbs operation of equipment which will permit such flow. Accordingly, no combination of manipulations of the two control switches S1 and S2 is possible by an unskilled operator which will cause improper operation and possible development of sufficiently solid frozen material in the freezer as to retard unduly or prevent rotation of the dasher structure.

It will thus be seen that the objects set forth above, among those made apparent from the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In apparatus for producing frozen confections, dasher means for a freezing cylinder of certain internal diameter comprising an elongated, axially-hollow, rotatable structure open from end to end and having a plurality of obliquely arranged, successive, plastic material-advancing means located therealong with outer portions thereof adapted to define in rotation circular paths of a diameter slightly less than the cylinder internal diameter, a plurality of opposed and axially aligned pairs of bearing means successively-arranged longitudinally along and about said structure and carried by said successive material-advancing means, and a plurality of centrifugally-cockable, longitudinally-lapping scrapers each rotatably supported substantially parallel to the axis of said structure by one of said pairs of bearing means.

2. The dasher means as defined in claim 1 characterized by the provision of said elongated rotatable structure as a spiralled rod the diameter of successive turns of which is slightly less than the cylinder internal diameter forming an axially-hollow screw device, opposed portions of successive turns thereof carrying said opposed pairs of scraper-supporting bearing means.

3. The dasher means as defined in claim 2 characterized by a relatively fixed whipping bar extending axially of said spiralled rod with the latter rotatable thereabout.

4. The dasher means as defined in claim 1 characterized by the provision of said elongated rotatable structure as a plurality of obliquely-arranged, axially-spaced blades fixedly mounted on rotatable, longitudinally-extending means to advance plastic material from one end to the other, opposed outer portions of successively alternate blades carrying said opposed pairs of scraper-supporting bearing means.

5. The dasher means as defined in claim 4 characterized by said blades having outer arcuate edges extending through about 180° with successive blades alternately arranged on opposite sides of said rotatable mounting means.

6. The dasher means as defined in claim 5 characterized by said blades being C-shaped with the tip portions thereof mounted on laterally-spaced rods extending substantially parallel to each other and the axis of said structure and with said rods comprising said rotatable mounting means.

7. The dasher means as defined in claim 1 characterized by the provision of said elongated rotatable structure as a pair of longitudinally-extending, laterally-spaced rods extending substantially parallel to the axis of said structure, a plurality of half blades each having its outer edge extending arcuately through about 180° with its central portion cut away, said blades being alternately arranged on opposite sides of and carried by said pair of rods, and an opposed pair of scraper-supporting and pivoting means carried by opposed portions of each pair of alternate blades at opposed points spaced at appreciable radial angles from medial portions of said blades so that each blade inward of end blades has at least one such means on one side thereof with ends of successive scrapers longitudinally overlapping.

8. The dasher means as defined in claim 7 characterized by the provision of a fixed, flat whipping bar extending axially of said structure and about which said rods and blades are rotatable.

9. The dasher means as defined in claim 8 characterized by the provision of support and driving means for said structure comprising a fixed stud shaft at one end to which one end of said flat whipping bar is connected, a rotatable journal on said stud shaft carrying one end of each of said rods, driven rotatable means carrying the other ends of said rods, and rotatable means on said driven means carrying the other end of said fixed whipping bar.

10. In apparatus for producing frozen confections, dasher means for a freezing cylinder of certain internal diameter comprising, in combination: a driven rotatable stud shaft; an opposed axially-spaced fixed stud shaft; a flat whipping bar fixed at one end to said fixed stud shaft; means rotatably supported on said driven stud shaft carrying the other end of said fixed whipping bar; a pair of laterally-spaced, longitudinally-extending rods each having an end eccentrically mounted on said driven stud shaft to be carried around therewith; journal means mounted on said fixed stud shaft eccentrically supporting the other ends of said rods; a plurality of C-shaped, longitudinally-spaced blades having their tips mounted on said rods with alternate blades arranged on the same side of said rods substantially at the same oblique angles to transverse planes with the intervening blades arranged on the opposite sides of said rods and obliqued in the opposite direction; a pair of pivoting pins mounted in opposed fashion on advance portions of alternate blades obliqued in the same direction; and a plurality of centrifugally-cockable, elongated scrapers pivotally mounted between each pair of opposed pivoting pins so that the ends of said scrapers longitudinally overlap.

11. Dasher means comprising a rotatable, axially-hollow, elongated structure having successively-arranged, obliquely-disposed, plastic material-advancing screw means with successive radially-outer portions thereof spaced longitudinally of said structure and providing scraper abutment means; a pair of opposed, longitudinally-extending pivot pins mounted on each successive pair of said screw means with one pin extending forward from the front of the trailing screw means and the other pin extending backward from the rear of the leading screw means, at least some of said pairs of opposed pins being located at different radial positions about said structure; and a plurality of longitudinally-extending, centrifugally-cockable, longitudinally-lapping scraper blades each having longitudinally-extending apertured base means pivotally mounted on said pins, the outside length of said base means being greater than the distance between opposed ends of said pins but less than the distance between the root of one pin and the tip of the other to permit ready mounting and dismounting with longitudinal sliding when said blade is swung out to a substantially radial position, and means on at least one end of each of said scraper blades to rest against said abutment means with the blade swung down toward a substantially tangential position and moved lengthwise to an intermediate position of simultaneous engagement of said opposed pins.

12. The dasher means as defined in claim 1 characterized by a relatively fixed whipping bar extending axially of said hollow rotatable structure with the latter rotatable thereabout.

13. The dasher means as defined in claim 12 characterized by said whipping bar being of relatively thin flat stock of appreciable width and extending axially through said hollow rotatable structure.

14. Dasher means comprising a rotatable, axially-hollow, elongated structure in the form of a spiralled rod with at least portions of successive turns thereof providing successively-arranged, obliquely-disposed, plastic material-advancing screw means with successive radially-outer portions thereof in any axial plane spaced longitudinally of said structure and providing scraper abutment means; a plurality of pairs of longitudinally-aligned and longitudinally-extending pivot pins with those of each pair being spaced an appreciable distance longitudinally and mounted on portions of a pair of said successive screw means turns and at least some of said pairs of opposed pins being located at different radial positions about said spiral rod structure; a plurality of longitudinally-extending, centrifugally-cockable, longitudinally-lapping scraper blades each having apertured longitudinally-spaced portions receivable of and pivotally mounted on and between one of said pairs of opposed pins, the longitudinal distance between the outer sides of said portions being greater than the distance between opposed ends of said pair of pins but less than the distance between the root of one pin and the tip of the other to permit ready mounting and dismounting with longitudinal sliding when said blade is swung out to a substantially longitudinal position; and means on at least one end of each of said scraper blades to rest against the adjacent abutment means with the blade swung down toward a substantially tangential position about its pair of opposed supporting pins.

References Cited in the file of this patent

UNITED STATES PATENTS

| | | |
|---|---|---|
| 1,981,008 | Torson | Nov. 20, 1934 |
| 2,470,691 | Erickson et al. | May 17, 1949 |
| 2,506,101 | Oltz | May 2, 1950 |
| 2,569,235 | Guisti et al. | Sept. 25, 1951 |